(12) United States Patent
Heidari et al.

(10) Patent No.: US 8,406,281 B2
(45) Date of Patent: Mar. 26, 2013

(54) APPARATUS, MODULE, AND METHOD FOR IMPLEMENTING COMMUNICATIONS FUNCTIONS

(75) Inventors: Ghobad Heidari, San Diego, CA (US); Kuor-Hsin Chang, Sunnyvale, CA (US); Paul L. Master, Sunnyvale, CA (US); Eugene B. Hogenauer, San Carlos, CA (US); Walter James Scheuermann, Saratoga, CA (US)

(73) Assignee: QST Holdings LLC, Palo Alto, CA (US)

( * ) Notice: Subject to any disclaimer, the term of this patent is extended or adjusted under 35 U.S.C. 154(b) by 1 day.

(21) Appl. No.: 12/607,916

(22) Filed: Oct. 28, 2009

(65) Prior Publication Data

US 2010/0220706 A1 Sep. 2, 2010

Related U.S. Application Data

(63) Continuation of application No. 12/343,220, filed on Dec. 23, 2008, now abandoned, which is a continuation of application No. 12/141,822, filed on Jun. 18, 2008, now abandoned, which is a continuation of application No. 10/067,496, filed on Feb. 4, 2002, now Pat. No. 7,400,668, which is a continuation-in-part of application No. 09/815,122, filed on Mar. 22, 2001, now Pat. No. 6,836,839.

(51) Int. Cl.
*H04B 1/707* (2011.01)

(52) U.S. Cl. .................................................... 375/150

(58) Field of Classification Search .......... 375/141–145, 375/260, 343, 367; 370/209, 320, 335, 342, 370/441

See application file for complete search history.

(56) References Cited

U.S. PATENT DOCUMENTS

| 5,602,833 | A  | * | 2/1997  | Zehavi ......................... 370/209 |
| 7,610,366 | B2 | * | 10/2009 | Wilson, Jr. .................... 709/223 |
| 2001/0034227 | A1 | * | 10/2001 | Subramanian et al. ....... 455/419 |
| 2003/0050055 | A1 | * | 3/2003  | Ting et al. .................... 455/419 |
| 2004/0127164 | A1 | * | 7/2004  | Mondragon-Torres et al. .......................... 455/67.11 |
| 2010/0293356 | A1 | * | 11/2010 | Plunkett et al. ................. 712/15 |

\* cited by examiner

*Primary Examiner* — Don N Vo
(74) *Attorney, Agent, or Firm* — Nixon Peabody LLP

(57) ABSTRACT

A system acquisition module and corresponding method for facilitating PN code searching which has a PN sequence generator configurable to generate a plurality of PN sequences. The module and method also includes computational units configurable to correlate each received signal sample of a plurality of received signal samples with a corresponding PN sequence of the plurality of PN sequences, and further configurable to provide other hardware resources. A number of computational units from the plurality of computational units are selectively configured to correlate the received signal samples with the PN sequences—the number depending upon availability of the plurality of computational units from providing the other hardware resources. In another embodiment, a communication device having a system acquisition function is provided which includes the system acquisition module and a receiver configured to receive signals, where a plurality of configurable computational units are selectively configurable to implement the PN sequence generator.

72 Claims, 6 Drawing Sheets

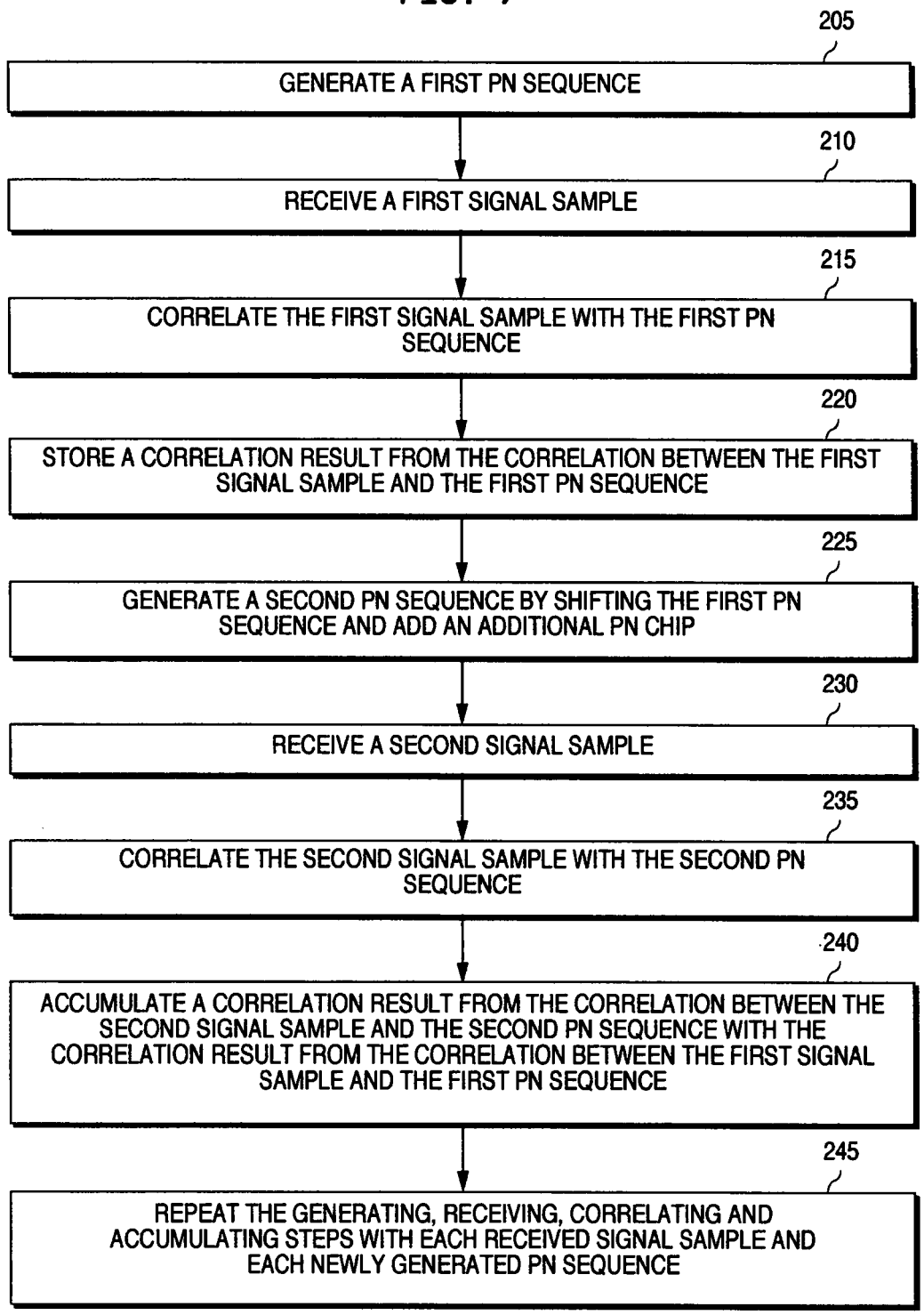

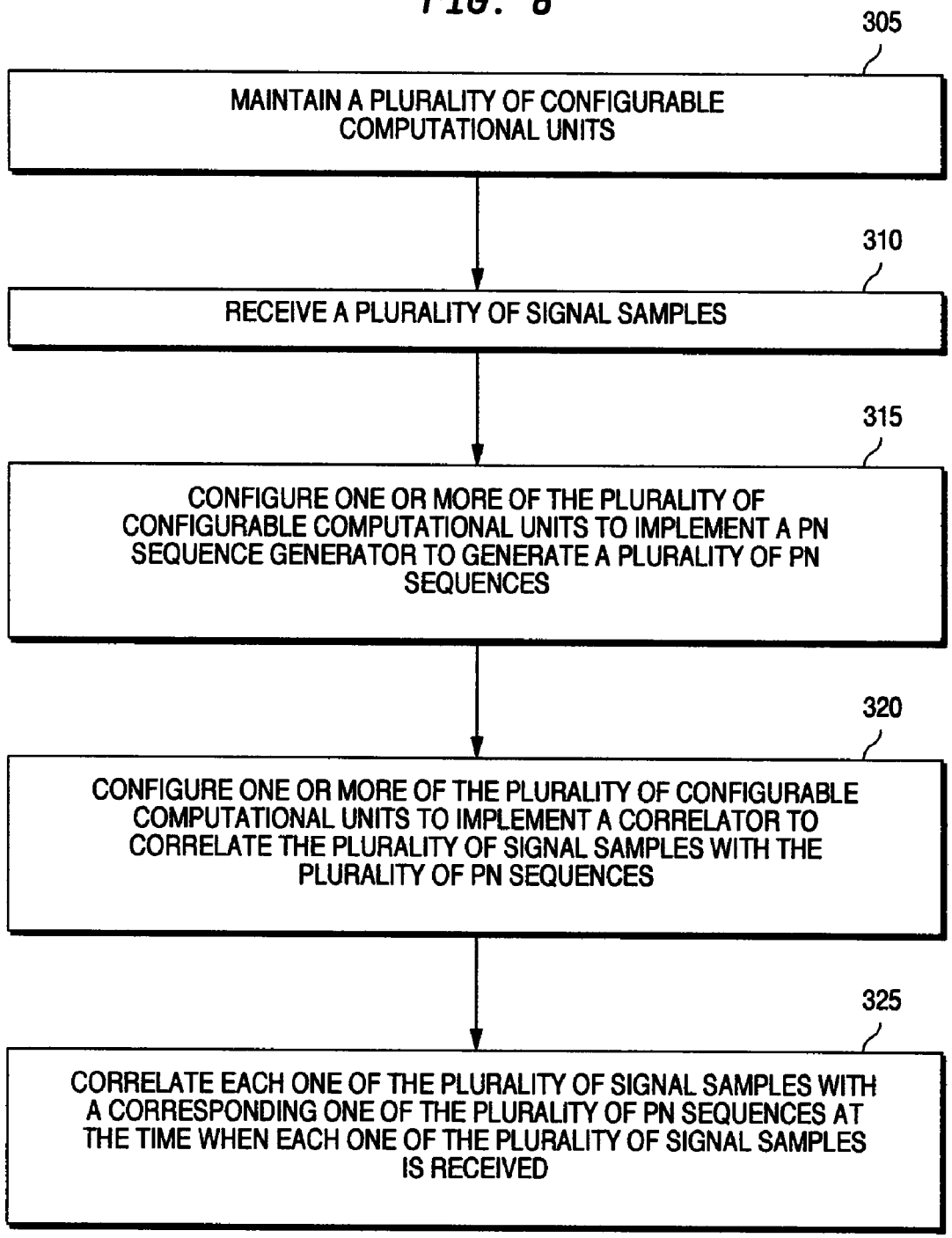

APPARATUS, MODULE, AND METHOD FOR IMPLEMENTING COMMUNICATIONS FUNCTIONS

CROSS-REFERENCES TO RELATED APPLICATION(S)

This application is a continuation of U.S. patent application Ser. No. 12/343,220, filed Dec. 23, 2008, now abandoned, which is a continuation of U.S. patent application Ser. No. 12/141,822, filed Jun. 18, 2008, now abandoned, which is a continuation of U.S. patent application Ser. No. 10/067,496, filed Feb. 4, 2002, now issued as U.S. Pat. No. 7,400,668 on Jul. 15, 2008, which is a continuation-in-part application of U.S. patent application Ser. No. 09/815,122, filed Mar. 22, 2001, now issued as U.S. Pat. No. 6,836,839 on Dec. 28, 2004, the disclosures of each of the aforementioned applications are hereby incorporated by reference in their entirety as if set forth in full herein for all purposes.

BACKGROUND OF THE INVENTION

The present invention generally relates to a system acquisition function. More specifically, the present invention relates to a method and system for implementing a system acquisition function for use with a communication device.

In CDMA communication systems, each base station differentiates amongst one another by using a unique PN code. A communication device, such as a mobile phone, is equipped with a system acquisition function, typically embodied in a searcher, to search for and locate the PN codes of the base stations within the vicinity of the mobile phone. Upon power-on, one of the initial tasks of the mobile phone is to find the strongest pilot signal from the nearby base stations as soon as possible. The task of finding the strongest pilot signal is commonly known as system or pilot acquisition and is usually performed by a searcher within the mobile phone.

Under one conventional approach, the system acquisition function within the mobile phone is implemented in the form of the searcher using a serial search technique that only utilizes a set of complex correlators to search for the correlation peak from one PN code offset to another. This approach consumes less power and requires less hardware; however, the search for the correlation peak may take longer.

Under another conventional approach, the searcher within the mobile phone is implemented using a traditional parallel search technique that utilizes several sets of fixed, dedicated correlators to compute the correlation peak in a concurrent manner. This other approach may shorten the search time but it does so at cost of incurring more hardware and power consumption. Furthermore, since the acquisition mode is typically less active than other modes, the exclusive use of fixed, dedicated correlators often results in a waste of hardware resources within the mobile phone.

More specifically, system or pilot acquisition in a CDMA communication system is typically performed as follows. Each base station continually broadcasts its own unique PN code in a periodic manner. One PN code from one base station differs from another PN code from another base station by an offset. Before a PN code can be identified by the mobile phone, the mobile phone first searches for signals at a particular frequency. As a result, only signals from base stations transmitting at that particular frequency are received by the mobile phone.

Next, the PN code of the base station which transmits the strongest pilot signal is identified and synchronized. The mobile phone receives signals from different base stations and these received signals are added up. Typically, the received signals are stored by the mobile phone before the correlation process begins. The mobile phone has a local PN sequence generator which is capable of generating sequences of PN codes. Initially, before the PN code of the base station which transmits the strongest pilot signal is identified, the PN sequence generator generates an initial PN code. This initial PN code is correlated with the received signals by a correlator residing in the mobile phone. Correlation is done to determine the power level of the received signals. The correlation results are examined to determine if the received signals representing the PN code of the transmitting base station fall within an acceptable time delay from the initial PN code to qualify as the strongest pilot signal. If the correlation results are below a predetermined threshold, i.e., the initial PN code generated by the local PN sequence generator does not qualify as the strongest pilot signal, then the local PN sequence generator shifts by one chip to generate another PN code and this other PN code is correlated with the received signals. The generation of PN codes and the correlation of these codes with the received signals continue until the strongest pilot signal is identified.

When the strongest pilot signal is identified, the PN code generated by the PN sequence generator and used to identify the strongest pilot signal is synchronized with the PN code of the base station which transmits the strongest pilot signal. Once the synchronization of the PN code is achieved, the mobile phone is able to communicate with the base station.

Furthermore, after pilot acquisition is completed, the mobile phone continues searching for nearby strong pilot signals and maintains a list to keep track of such signals. This process is commonly called set maintenance. That is, in addition to the strongest pilot signal, the mobile phone also searches for and keeps track of a number of additional pilot signals (and their associated PN codes) with different levels of signal strength. For example, the mobile phone may maintain an active set which keeps track of additional multipaths associated with the pilot signal of the base station that the mobile phone is currently communicating with, a candidate set with pilot signals whose strengths exceed certain threshold, and a neighbor set that includes pilot signals from cells that are in the vicinity of the cells that the mobile phone is communicating with. Maintaining a number of additional pilot signals (and their associated PN codes) facilitates the handoff process. A handoff typically occurs when a mobile phone is roaming from one area to another. This happens when a pilot signal transmitted from another base station is stronger than the one that the mobile phone is currently communicating with. The candidate set may be used to more efficiently identify the new base station transmitting the strongest pilot signal. This is because the strongest pilot signal is more likely to be one of the signals included in the candidate set. Hence, the associated PN code can be retrieved more quickly and communication with the new base station likewise can be established in a shorter period of time.

As can be seen above, the received signals need to be stored by the mobile phone so they can be subsequently used for correlation purposes. Furthermore, generation of the PN codes by the PN sequence generator is done in a sequential manner by shifting the current PN code.

Hence, it would be desirable to provide a method and system to implement a searcher for use with a mobile phone to more efficiently identify the PN code of the base station which transmits the strongest pilot signal.

SUMMARY OF THE INVENTION

A method and system for implementing a system acquisition function for use with a communication device is provided. According to one exemplary embodiment of the system, the system acquisition function is embodied in a searcher. The searcher is embedded in the communication device, such as, a mobile phone. The searcher includes one or more computational units which are used to perform a PN sequence generation function to generate PN sequences. Each PN sequence is comprised of a number of PN chips. The searcher further includes a number of computational units which are used to correlate received signal samples with the PN chips generated by the PN sequence generation function. As each signal sample is received by the communication device, the received signal sample is correlated (complex multiplied) with a PN sequence in a parallel manner using the computational units. The sample correlation results are then respectively accumulated within each computational unit that conducts the corresponding sample correlation. As the next signal sample is received, this newly received signal sample is similarly correlated with the next PN sequence in a parallel manner. Likewise, the sample correlation results are also accumulated. The foregoing process is repeated until all the signal samples needed to complete a signal correlation are received and correlated with the PN sequences. The number of PN chips within a PN sequence used to correlate with each received signal sample is equivalent to a correlation length chosen such that the correlation results between each received signal sample and the locally generated PN sequence are sufficiently reliable to determine whether the strongest pilot is found.

According to another aspect of the system, the computational units are implemented using adaptive hardware resources. The number of computational units which are used to implement the PN sequence generation function and the correlation function are adjustable depending on, for example, the amount of available adaptive hardware resources.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 7 is a flow diagram illustrating a first exemplary method embodiment in accordance with the present invention; and FIG. 8 is a flow diagram illustrating a second exemplary method embodiment in accordance with the present invention.

DETAILED DESCRIPTION OF THE INVENTION

Figure 1:
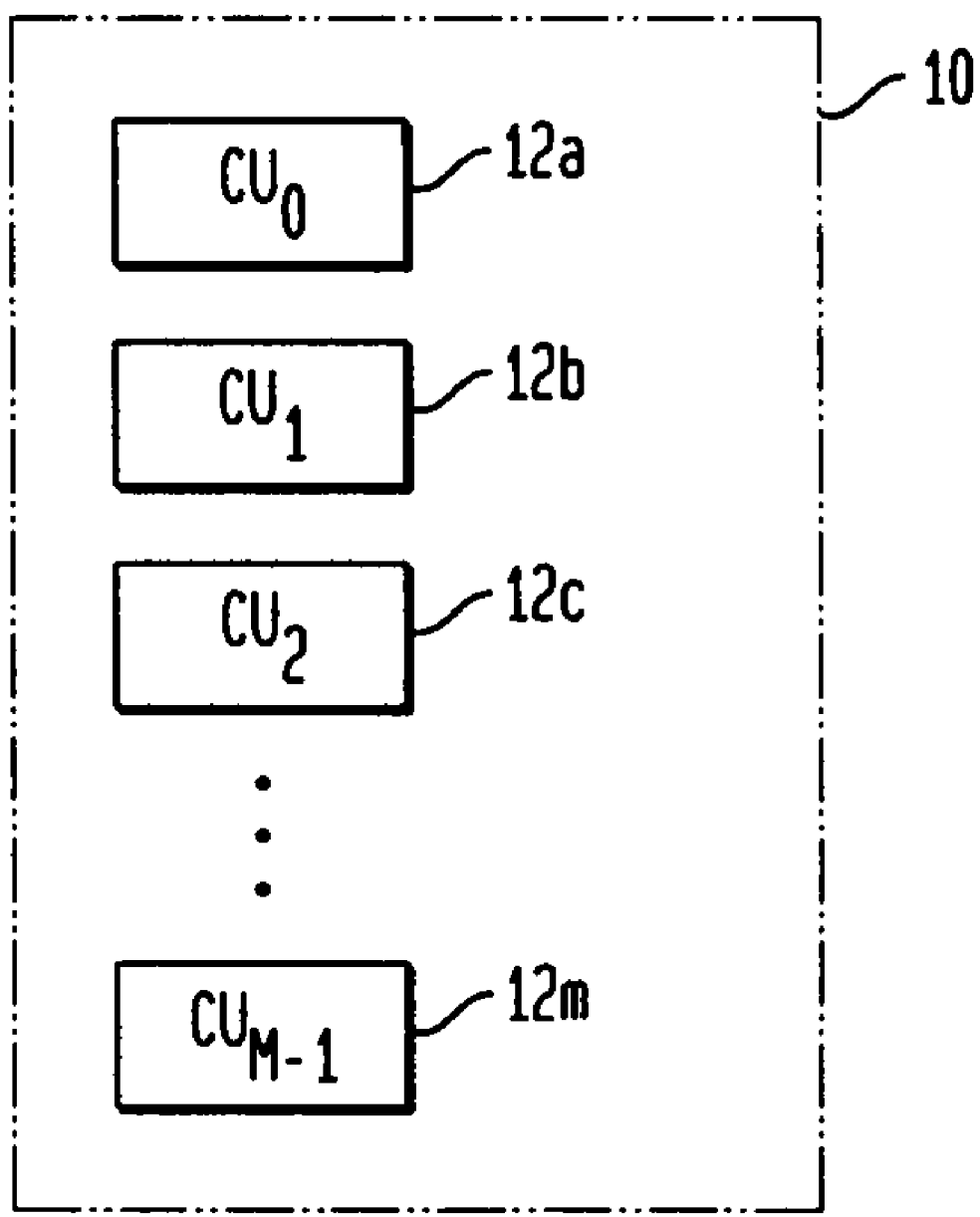
FIG. 1 is a simplified diagram illustrating an exemplary embodiment of an M-node having four (4) computational units in accordance with the present invention.

The present invention in the form of one or more exemplary embodiments will now be described. FIG. 1 is a simplified diagram illustrating an exemplary embodiment of the present invention. Referring to FIG. 1, there is shown a searcher 10 having a number of computational units 12a-m. The searcher 10 can be located in any type of communication device, such as a mobile phone. As will be further demonstrated below, each computational unit 12a-m correlates the received signal samples with a corresponding PN chip. In an exemplary embodiment, these computational units 12a-m are implemented using reconfigurable hardware resources within an adaptive computing architecture. Details relating to the adaptive computing architecture and how reconfigurable hardware resources are used to implement functions on an on-demand basis are disclosed in U.S. patent application Ser. No. 09/815,122, filed on Mar. 22, 2001 (now U.S. Pat. No. 6,836,839, issued Dec. 28, 2004), entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS", the disclosure of which is hereby incorporated by reference in their entirety as if set forth in full herein for all purposes. That prior application is also referred to herein as "the Ser. No. 09/815,122 application".

The adaptive computing architecture described in the Ser. No. 09/815,122 application is also referred to therein and herein as an adaptive computing engine (ACE) architecture. Certain embodiments of the ACE architecture described the Ser. No. 09/815,122 application include configurable hardware resources in the form of computational elements for different functions such as, but not limited to, memory, addition, multiplication, complex multiplication, subtraction, configuration, reconfiguration, control, input, output, and field programmability. Certain embodiments are further described in the Ser. No. 09/815,122 application wherein, in response to configuration information, an interconnection network is operative in real-time to configure and reconfigure the plurality of heterogeneous computational elements for a plurality of different functional modes, including linear algorithmic operations, non-linear algorithmic operations, finite state machine operations, memory operations, and bit-level manipulations.

The ACE architecture according to certain embodiments described in the Ser. No. 09/815,122 application provides a single IC, which may be configured and reconfigured in real-time, using specific computational elements, to perform a wide variety of tasks. For example, utilizing differing configurations over time of the same set of heterogeneous computational elements, the ACE architecture may implement digital signal processing (DSP) functions such as finite impulse response filtering, fast Fourier transformation, discrete cosine transformation, and with other types of computational elements, may implement many other high level processing functions for advanced communications and computing. Computational elements such as pluralities of multipliers, complex multipliers, and adders, each of which are designed for optimal execution of corresponding multiplication, complex multiplication, and addition functions, are disclosed in the Ser. No. 09/815,122 application.

The temporal nature of the ACE architecture is also described in the Ser. No. 09/815,122 application. In the regard, at any given instant of time, utilizing different levels of interconnect, a particular configuration may exist within the ACE which has been optimized to perform a given function or implement a particular algorithm. At another instant in time, the configuration may be changed, to interconnect other computational elements or connect the same computational elements differently, for the performance of another function or algorithm. Two important features arise from this temporal reconfigurability. First, as algorithms may change over time to, for example, implement a new technology standard, the ACE may co-evolve and be reconfigured to implement the new algorithm. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements for the performance of various different algorithms illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used therein and herein, includes the additional capability of adding or creating new functions which were previously unavailable or non-existent.

The Ser. No. 09/815,122 application describes certain embodiments of the ACE architecture that may have various and different operating modes as a cellular or other mobile telephone, a music player, a pager, a personal digital assistant, and other new or existing functionalities. In addition, these operating modes may change based upon the physical location of the device, for example. As described in the Ser. No. 09/815,122 application, the ACE may, for example, be configured as a CDMA mobile telephone for use in the United States, and the ACE may be reconfigured as a GSM mobile telephone for use in Europe.

The ACE architecture is further contrasted with other architectures in the Ser. No. 09/815,122 application, wherein an ASIC, for example, once etched, is not readily changeable, with any modification being time-consuming and expensive, effectively requiring new masks and new fabrication. As a further result, ASIC design virtually always has a degree of obsolescence, with a design cycle lagging behind the evolving standards for product implementations. For example, as described in the Ser. No. 09/815,122 application, an ASIC designed to implement GSM or CDMA standards for mobile communication becomes relatively obsolete with the advent of a new standard, such as 3G.

Regarding the present invention, it should be understood that while the present invention is described as being in the searcher 10, it will be appreciated by a person of ordinary skill in the art that the present invention can be implemented in other manners within a communication device. For example, some or all of the functionality of the present invention as described herein may be implemented outside of the searcher 10 in other parts of the communication device.

In an exemplary embodiment, the computational units 12a-m are arranged in a sequential order and configured to calculate the correlations between the received signal samples and a number of PN sequences. The start of any two adjacent PN sequences is offset by one chip. More specifically, the computational units 12a-m correlate each received signal sample with their corresponding components of a PN sequence in a parallel manner.

The PN sequences used by the computational units 12a-m are generated in a successive, offset order. The starting position of each successive PN sequence is only one chip off from the preceding PN sequence. The PN chips of each PN sequence can be provided to the computational units 12a-m in a number of ways. For example, the PN chips can be generated by either a PN sequence generator implemented in the form of another computational unit (not shown) or a RISC processor. As will be described further below, each PN chip is shifted into a corresponding computational unit 12a-m. Each computational unit 12a-m includes a local memory for storing its corresponding PN chip.

Figure 2:
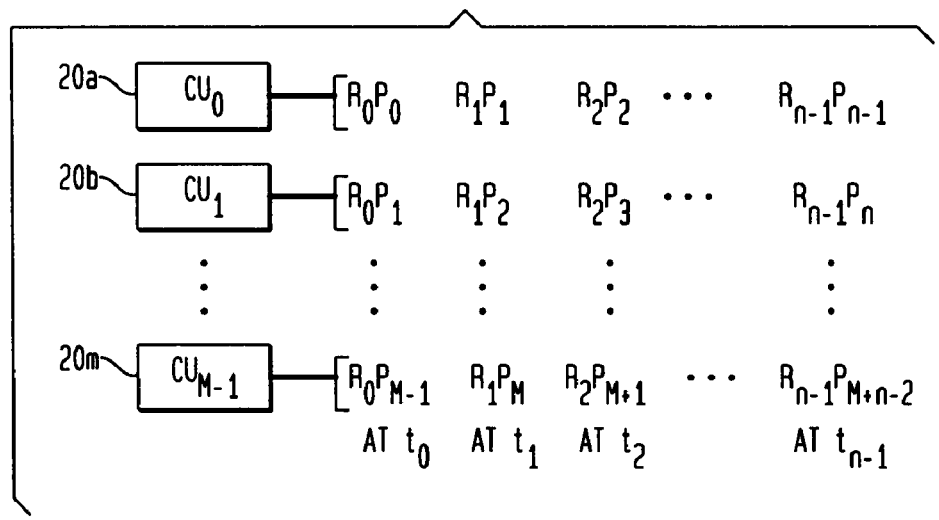
FIG. 2 is a simplified diagram illustrating an exemplary method for performing correlations in accordance with the present invention.

FIG. 2 illustrates an exemplary method for performing correlations in accordance with the present invention. Assume the time duration of a received signal sample is $T_d$, that is, one signal sample is received every $T_d$. Then, conversely, the frequency of the received signal sample is $1/T_d = f_d$.

Figure 6:
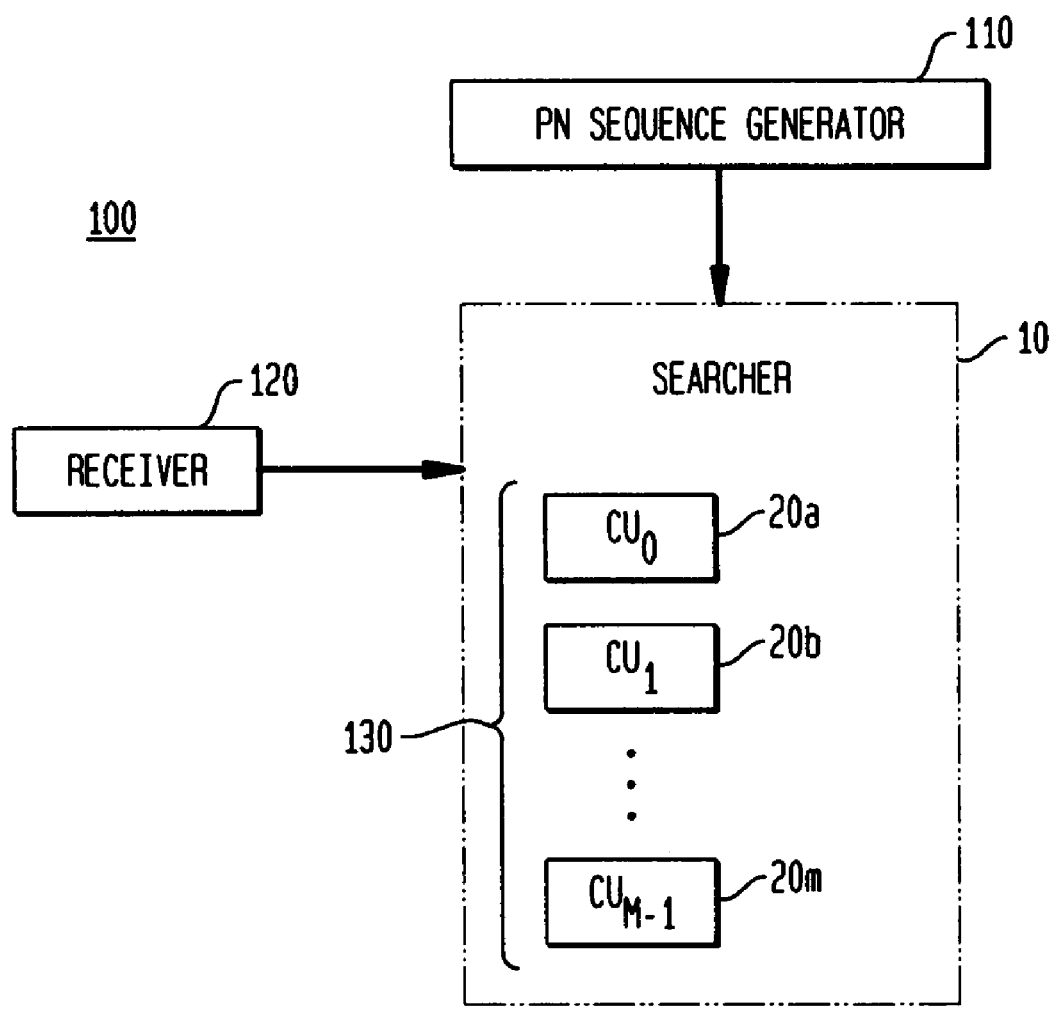
FIG. 6 is a block diagram illustrating an exemplary system embodiment in accordance with the present invention.

Referring to FIG. 2, there are m computational units 20a-m within the searcher 10. At time $t_0$, signal sample $R_0$ is received by a receiver (not shown) located within the communication device. Signal sample $R_0$ is then correlated with the PN sequence, $P_0 P_1 \ldots P_{M-1}$. The PN sequence, $P_0 P_1 \ldots P_{M-1}$, is generated by a PN sequence generator (as shown in FIG. 6) located within the communication device. Since there are M PN chips within the PN sequence, M computational units 20a-m are used to do the correlations in parallel. Hence, each computational unit 20a-m correlates the signal sample $R_0$ with one PN chip. For example, computational unit 20a correlates $R_0$ with $P_0$ to generate correlation result $R_0 P_0$. The collective correlation results generated by the computational units 20a-are as follows: $R_0 P_0, R_0 P_1, \ldots, R_0 P_{M-1}$. The correlations are performed and the correlation results are respectively accumulated into the computational units 20a-m before the next signal sample $R_1$ is received at time $t_1$. The signal sample $R_0$ may then be discarded after the correlations are performed.

At time $t_1$, signal sample $R_1$ is received. Signal sample $R_1$ is then correlated with a second PN sequence, $P_1 P_2 \ldots P_M$. The PN sequence, $P_1 P_2 \ldots P_M$, is only a shift of the PN sequence used at time $t_0$ plus a newly generated PN chip $P_M$. That is, the start of the new PN sequence is offset by one chip from the preceding PN sequence. Consequently, the new PN sequence can be supplied to or propagated through the computational units 20a-m as follows. Except for the last computational unit 20m, each computational unit 20a-1 receives its corresponding PN chip for the next correlation from its neighbor. The last computational unit 20m receives its corresponding PN chip $P_M$ from the PN sequence generator. In other words, except for the first computational unit 20a, each remaining computational unit 20b-m passes its current PN chip to its neighbor in the same direction. As to the first computational unit 20a, its current PN chip is discarded; and as to the last computational unit 20m, as mentioned above, the PN sequence generator provides the next PN chip. For example, after the correlations are completed for the received signal sample $R_0$ (which is some time before time $t_1$), computational unit 20a discards its current PN chip $P_0$ and receives its next PN chip (which will be $P_1$) from computational unit 20b; computational unit 20m passes its current PN chip $P_{M-1}$ to its neighboring computational unit 201 (not shown) and receives its next PN chip $P_M$ from the PN sequence generator; and the remaining computational units 20b-1 pass their current PN chips respectively to their neighbors in one direction and receive their next PN chips respectively from their neighbors in the other direction.

Again, since there are M PN chips within a PN sequence, M computational units 20a-m are used to do the correlations in parallel. This time around, the collective correlation results generated by the computational units 20a-m are as follows: $R_1P_1, R_1P_2, \ldots, R_1P_m$. The correlations are performed and the results are accumulated with the correlation results that were done at time $t_0$ before the next signal sample $R_2$ is received at time $t_2$. Hence, for example, before time $t_2$, computational unit 20a contains correlation results $R_0P_0$ and $R_1P_1$. The foregoing process is repeated until the last signal sample $R_{n-1}$ is received at time $t_{n-1}$ and then correlated with the PN sequence, $P_{n-1}P_n \ldots P_{M+n-2}$ generating the following collective correlation results: $R_{n-1}P_{n-1}, R_{n-1}P_n, \ldots, R_{n-1}P_{M+n-2}$.

At the end of the time period, $t_{n-1}+T_d$, the correlation results for the received signal samples, $R_0R_1 \ldots R_{n-1}$, with n different PN sequences that are offset by one chip between the start of any two adjacent PN sequences, are then obtained. For example, $R_0P_0+R_1P_1+\ldots+R_{n-1}P_{n-1}$ represent the correlation results accumulated at computational unit 20a. Also, at the end of the time period, $t_{n-1}+T_d$, M different PN code offsets have been searched. If the number of PN chips, within a PN sequence, that need to be searched is M or fewer, then the entire search process is completed at the end of the time period $t_{n-1}+T_d$.

Figure 3:
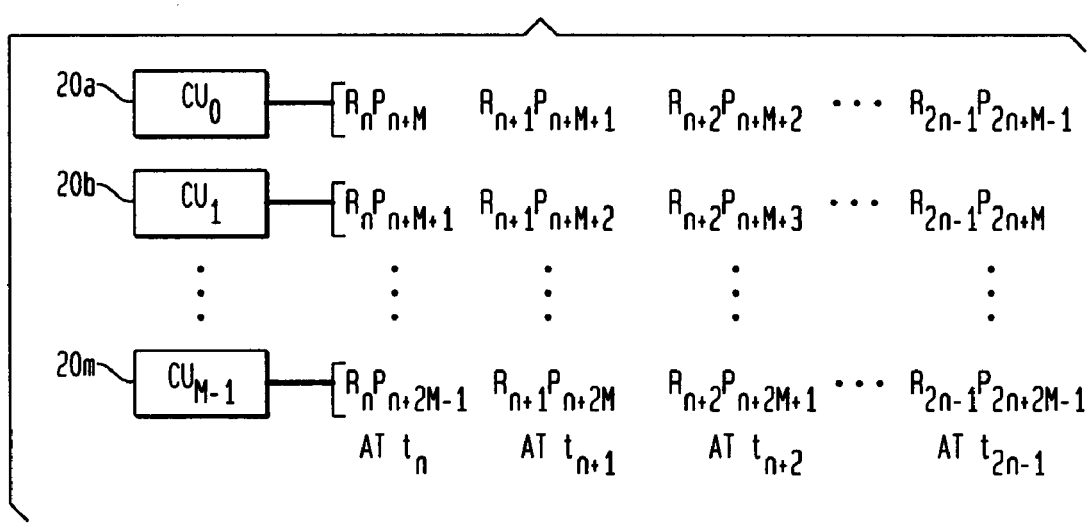
FIG. 3 is a simplified diagram illustrating the exemplary method as shown in FIG. 2 for performing an additional round of correlations in accordance with the present invention.

If the number of PN chips, within a PN sequence, that need to be searched is more than M, then a second round of search or correlations (or additional rounds if necessary) may be performed. The length (time-wise) of a round of correlations is the time period $t_{n-1}+T_d$. For example, FIG. 3 illustrates this second round of correlations. Before the second round of correlations begins, the accumulated correlation results in each of the computational unit 20a-m are transferred and stored in other memory locations and then cleared. Referring to FIG. 3, in the second round of correlations, the received signal sample $R_n$ is correlated by the computational units 20a-m with the PN sequence, $P_{n+M}P_{n+M+1} \ldots P_{n+2M-1}$ at time $t_n$. The correlation results are then accumulated at each of computational unit 20-a-m.

At time $t_{n+1}$, the signal sample $R_{n+1}$ is correlated with the next PN sequence, $P_{n+M+1}P_{n+M+2} \ldots P_{n+2M}$. Similarly, the start of this next PN sequence is offset from the preceding P sequence by one chip and a new PN chip is added at the end. This process will continue until the second round of correlations is completed. For the second round of real-time correlations, another M PN offsets ($P_M, P_{M-1}, \ldots, P_{2M+1}$) are searched. The correlation results are then stored and cleared from each computational unit 20a-m before the next round of correlations starts.

According to the exemplary method shown in FIG. 2, all the received signal samples $R_x$ are not stored first and then later used for correlation purposes. Instead, as each signal sample $R_x$ is received, the signal sample $R_x$ is correlated with M PN chips and then accumulated. The collective correlation results for all the received signal samples $R_x$ are then examined to identify the PN sequence which corresponds to the strongest pilot signal. Hence, the collective correlation results for the received signal samples $R_x$ can be derived much faster. In addition, since all the received signal samples $R_x$ need not be stored before the correlation function is performed, the memory overhead and hardware requirements and costs correspondingly become less.

As can be seen from FIG. 2, for each time period $T_d$, M computational units 20a-m are used to correlate a received signal sample $R_x$ with a PN sequence which has M PN chips. For each time period $T_d$, each computational unit 20a-m performs one correlation. As a result, with M computational units 20a-m, M correlations are collectively performed. As will be further described below, the number of computational units 20a-m which are used to perform the correlations is scalable. That is, the number of computational units 20a-m may vary depending on the amount of hardware resources available and the clock rate that is used to drive each computational unit.

Referring back to FIG. 2, for each time period $T_d$ and a PN sequence with M PN chips, each computational unit performs one correlation thereby resulting in M correlations being performed. However, each computational unit is not necessarily restricted to performing one correlation during each time period $T_d$.

Figure 4:
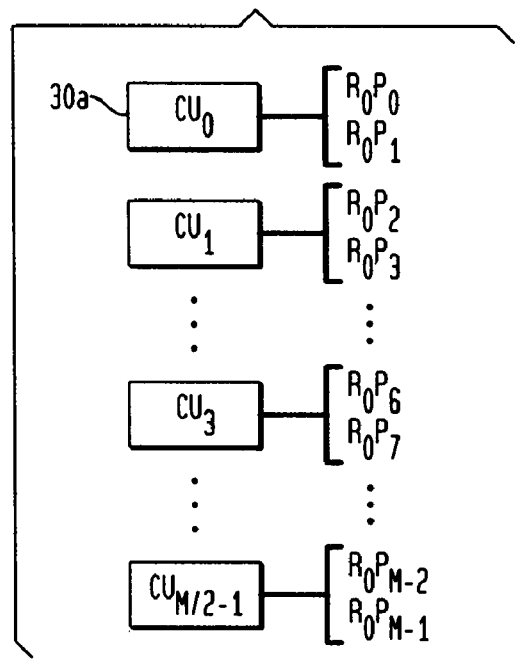
FIG. 4 is a simplified diagram illustrating a second exemplary method for performing correlations in accordance with the present invention.

Each computational unit may perform two or more correlations per time period $T_d$. While M correlations are to be performed per time period $T_d$, these M correlations may be collectively performed by a fewer number of computational units. For example, referring to FIG. 4, there are M/2 computational units. In this case, each of the M/2 computational units is driven to perform two (2) correlations within the time period $T_d$; for instance, computational unit 30a performs two (2) correlations and generates correlation results $R_0P_0$ and $R_0P_1$. In order to perform two (2) correlations with the time period $T_d$, each computational unit is driven at a higher clock rate to increase the speed of execution.

Figure 5:
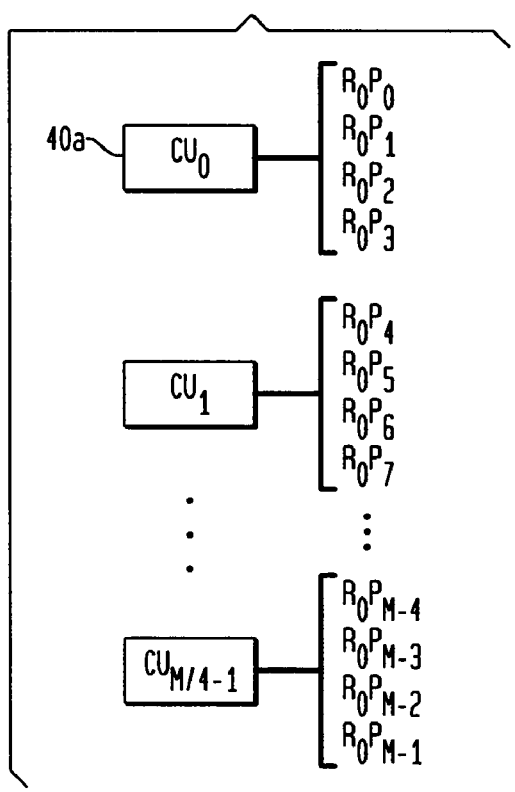
FIG. 5 is a simplified diagram illustrating a third exemplary method for performing correlations in accordance with the present invention.

In another example, as shown in FIG. 5, there are M/4 computational units. In this case, each of the M/4 computational units is driven to perform four (4) correlations within the time period $T_d$; for instance, computational unit 40a performs four (4) correlations and generates correlation results $R_0P_0$, $R_0P_1$, $R_0P_2$ and $R_0P_3$. In order to perform four (4) correlations with the time period $T_d$, each computational unit is driven at an even higher clock rate to increase the speed of execution.

FIG. 6 is a block diagram illustrating an exemplary system 100 embodiment in accordance with the present invention. As illustrated, an exemplary system 100, for implementing a system acquisition function to facilitate PN code searching, comprises: a PN sequence generator 110 configured to generate a plurality of PN sequences; and a searcher 10 having a plurality of computational units 20a-20m forming a correlator 130 and configurable to correlate a received signal sample (from receiver 120) with a PN sequence generated by the PN sequence generator, the correlations being executed in a parallel manner. As discussed above, the plurality of PN sequences are generated in a sequential manner; the plurality of PN sequences includes a first PN sequence and a second PN sequence, the second PN sequence immediately following the first PN sequence; and the start of the second PN sequence is determined by shifting the first PN sequence. In addition, a number of computational units from the plurality of computational units are selectively configured to correlate the received signal sample with the PN sequence, with the number of computational units which are selectively configured to correlate the received signal with the PN sequence depending on availability of the plurality of computational units.

FIG. 7 is a flow diagram illustrating a first exemplary method embodiment for implementing a system acquisition function to facilitate the PN code searching in accordance with the present invention. The first exemplary method begins with generating a first PN sequence, the first PN sequence being made up of a plurality of PN chips, step 205, and receiving a first signal sample, step 210. The first signal sample is correlated with the first PN sequence upon receiving the first signal sample, step 215, and a correlation result from the correlation between the first signal sample and the first PN sequence is stored, step 220. A second PN sequence is generated by shifting the first PN sequence and adding an additional PN chip, step 225, and a second signal sample is received, step 230. The second signal sample is correlated with the second PN sequence, step 235, and the methodology accumulates a correlation result from the correlation between the second signal sample and the second PN sequence with the correlation result from the correlation between the first signal sample and the first PN sequence, step 240. The method then repeats the above generating, receiving, correlating and accumulating steps with each received signal and each newly generated PN sequence, step 245.

FIG. 8 is a flow diagram illustrating a second exemplary method embodiment for implementing a system acquisition function to facilitate PN code searching in accordance with the present invention. The second exemplary method begins with maintaining a plurality of configurable computational units, step 305, and receiving a plurality of signal samples, step 310. One or more of the plurality of configurable computational units are configured to implement a PN sequence generator to generate a plurality of PN sequences, step 315. One or more of the plurality of configurable computational units are configured to implement a correlator to correlate the plurality of signal samples with the plurality of PN sequences, step 320. Each one of the plurality of signal samples is correlated with a corresponding one of the plurality of PN sequences at the time when each one of the plurality of signal samples is received, step 325. As discussed above, the number of configurable computational units used to implement the correlator depends on availability of the plurality of configurable computational units. In addition, the method may also provide for generating the plurality of PN sequences in a sequential manner, wherein the plurality of PN sequences includes a first PN sequence and second PN sequence, the second PN sequence immediately following the first PN sequence, and wherein the start of the second PN sequence is determined by shifting the first PN sequence.

Based on the disclosure provided herein, a person of ordinary skill in the art should be able to determine the appropriate number of computational units to be used to implement the PN sequence generation function and the correlation function in accordance with the present invention. The number of computational units which can be used depends on a number of factors, such as the availability of the configurable hardware resources, the incoming signal rate or, conversely, the signal period, and the available clock rates, etc. For instance, if only a limited number of computational units can be used, then the clock rate may need to be driven higher in order to perform the requisite number of correlations. Conversely, if additional hardware resources are available, additional computational units driven at a lower clock rate may be implemented to perform the same number of correlations. For another instance, if the signal period is shortened, then additional computational units may be needed to perform the requisite number of correlations within the signal period.

The present invention as described above can also be used to provide more efficient set maintenance. Signals from the base station which previously transmitted the strongest pilot signal can be searched and correlated more quickly to confirm that this base station continues to be the one transmitting the strongest pilot signal. Likewise, signals from the base stations which correspond to the candidate set and the neighbor set respectively can also be searched and correlated more quickly to update the status of the neighbor set and the neighbor set. A candidate set may be searched more frequently than a neighbor set. As a result, the set maintenance update cycle is reduced.

Moreover, while the above disclosure provided above is described in connection with a searcher 10, it should be understood that the present invention is not restricted to use with a searcher and that the present invention is applicable to and can be used with any communication devices which are capable of performing a system acquisition function.

It is understood that the present invention as described above is applicable to a Code Division Multiple Access (CDMA) communication system but that a person of ordinary skill in the art should know of other ways and/or methods to apply the present invention to other types of communication systems.

Furthermore, it is to be understood that the present invention as described above can be implemented in the form of control logic using software, hardware or a combination of both. Based on the disclosure provided herein, a person of ordinary skill in the art will know of other ways and/or methods to implement the present invention.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A communications device comprising:
   a plurality of reconfigurable hardware resources configurable to provide a first communications function, the plurality of reconfigurable hardware resources further configurable or reconfigurable to provide at least a second communications function;
   an interconnection network having interconnections coupled to each of the plurality of reconfigurable hardware resources; and
   control logic adapted to selectively configure a first number of reconfigurable hardware resources from the plurality of reconfigurable hardware resources by changing the interconnections of the interconnection network between the first number of reconfigurable hardware resources to provide the first communications function at one point in time, the control logic further adapted to selectively configure a second number of reconfigurable hardware resources from the plurality of reconfigurable hardware resources to provide at least the second communications function at another point in time by changing the interconnections of the interconnection network between the second number of reconfigurable hardware resources including reconfiguring at least some of the first number of reconfigurable hardware resources by changing the interconnections between the at least some of the first number of reconfigurable hardware resources,
   wherein the first communications function comprises at least a portion of a system acquisition function, wherein the system acquisition function includes:
      a receiver function portion to receive a plurality of signals;
      a PN sequence generator function portion to generate a plurality of PN sequences; and
      a correlator function portion to correlate the plurality of signals with the plurality of PN sequences, wherein at least one of the plurality of hardware resources implements the receiver function, at least one of plurality of hardware resources implements the PN sequence generator function, and wherein at least one of the plurality of hardware resources implements the correlation function, and wherein the at least one of the plurality of hardware resources perform two or more correlations per time period.

2. The communications device of claim 1, wherein the communications device comprises a mobile phone for use in a Code Division Multiple Access (CDMA) communication system.

3. The communications device of claim 1, wherein the communications device is a base station.

4. The communications device of claim 1, wherein at least some of the reconfigurable hardware resources comprise a plurality of configurable and reconfigurable digital signal processing (DSP) computational units, the control logic further adapted to selectively configure and reconfigure a third number of digital signal processing computational units depending on for which communications standard the digital signal processing computational units are to be selectively configured or reconfigured.

5. The communications device of claim 1, wherein the first communications function is one of a Code Division Multiple Access (CDMA), a Wideband Code Division Multiple Access (W-CDMA), or a Global System for Mobile Communications (GSM) communications function, and the second communications function is one of a Code Division Multiple Access (CDMA), a Wideband Code Division Multiple Access (W-CDMA), or a Global System for Mobile Communications (GSM) communications function.

6. The communications device of claim 1, wherein the first and second number of reconfigurable hardware resources from the plurality of reconfigurable hardware resources depend on availability of the plurality of reconfigurable hardware resources from providing other functions.

7. The communications device of claim 1, wherein the first and second number of reconfigurable hardware resources from the plurality of reconfigurable hardware resources depend on the available clock rate driving the plurality of reconfigurable hardware resources.

8. The communications device of claim 7, wherein the first number of reconfigurable hardware resources selectively configured by the control logic to provide the first communications function at one point in time is capable of being reduced when the available clock rate driving the plurality of reconfigurable hardware resources is increased.

9. The communications device of claim 1, wherein the first and second number of reconfigurable hardware resources from the plurality of reconfigurable hardware resources depend on the incoming signal rate of signals for the first and second communications functions.

10. The communications device of claim 1, wherein the first and second number of reconfigurable hardware resources from the plurality of reconfigurable hardware resources depend on the incoming signal period of signals operated on by the first and second communications functions.

11. The communications device of claim 1, wherein the plurality of reconfigurable hardware resources are further configurable or reconfigurable to provide at least one other function.

12. The communications device of claim 11, wherein the first and second number of reconfigurable hardware resources from the plurality of reconfigurable hardware resources depend on how many of the plurality of reconfigurable hardware resources are needed to provide the at least one other function.

13. The communications device of claim 11, wherein the at least one other function is a non-communications function.

14. The communications device of claim 1, wherein the plurality of reconfigurable hardware resources comprise a plurality of reconfigurable computational units.

15. The communications device of claim 14, wherein the plurality of configurable computational units comprise a plurality of configurable heterogeneous computational elements units.

16. The communications device of claim 1, wherein the first communications function comprises at least a portion of a system acquisition function.

17. The communications device of claim 16, further comprising dedicated hardware to provide another portion of the system acquisition function.

18. The communications device of claim 1, further comprising:
a PN sequence generator to provide the PN sequence generator function portion of the system acquisition function; and
dedicated hardware to provide the PN sequence generator.

19. The communications device of claim 1, further comprising:
dedicated hardware to provide another portion of the system acquisition function; and
wherein the other portion comprises one of the receiver function portion, the PN sequence generator function portion, or the correlator function portion.

20. The communications device of claim 19, wherein the other portion of the system acquisition function is the receiver function portion.

21. The communications device of claim 1, wherein the control logic selectively configures the first number of reconfigurable hardware resources to provide the at least a portion of the system acquisition function; and
wherein the at least a portion of the system acquisition function comprises at least one of the receiver function portion, the PN sequence generator function portion, or the correlator function portion.

22. The communications device of claim 1, wherein the at least a portion of the system acquisition function comprises the receiver function portion, the PN sequence generator function portion, and the correlator function portion; and
wherein the control logic selectively configures the first number of reconfigurable hardware resources to provide the receiver function portion, the PN sequence generator function portion, and the correlator function portion.

23. The communications device of claim 22, wherein the control logic selectively configures or reconfigures one or more of the first number of configurable hardware resources to provide at least one other function when not needed to provide the receiver function portion, the PN sequence generator function portion, and the correlator function portion.

24. The communications device of claim 1, further comprising a receiver and a correlator.

25. A communications module in a communications device, the communications module comprising:
a plurality of reconfigurable hardware resources configurable to provide a first communications function, the plurality of reconfigurable hardware resources further configurable or reconfigurable to provide at least a second communications function;

an interconnection network having interconnections coupled to each of the plurality of reconfigurable hardware resources; and control logic adapted to selectively configure a first number of reconfigurable hardware resources from the plurality of reconfigurable hardware resources by changing the interconnections of the interconnection network between the first number of reconfigurable hardware resources to provide the first communications function at one point in time, the control logic further adapted to selectively configure a second number of reconfigurable hardware resources from the plurality of reconfigurable hardware resources to provide at least the second communications function at another point in time by changing the interconnections of the interconnection network between the second number of reconfigurable hardware resources including reconfiguring at least some of the first number of reconfigurable hardware resources by changing the interconnections between the at least some of the first number of reconfigurable hardware resources, wherein the first communications function comprises at least a portion of a system acquisition function, wherein the system acquisition function includes:

a receiver function portion to receive a plurality of signals;

a PN sequence generator function portion to generate a plurality of PN sequences; and a correlator function portion to correlate the plurality of signals with the plurality of PN sequences, wherein at least one of the plurality of hardware resources implements the receiver function, at least one of plurality of hardware resources implements the PN sequence generator function, and wherein at least one of the plurality of hardware resources implements the correlation function, and wherein the at least one of the plurality of hardware resources perform two or more correlations per time period.

26. The communications module of claim 25, wherein the communications device is a mobile phone for use in a Code Division Multiple Access (CDMA) communication system.

27. The communications module of claim 25, wherein the communications device is a base station.

28. The communications module of claim 25, wherein at least some of the reconfigurable hardware resources comprise a plurality of configurable and reconfigurable digital signal processing (DSP) computational units, the control logic further adapted to selectively configure and reconfigure a third number of digital signal processing computational units depending on for which communications standard the digital signal processing computational units are to be selectively configured or reconfigured.

29. The communications module of claim 25, wherein the first communications function is one of a Code Division Multiple Access (CDMA), a Wideband Code Division Multiple Access (W-CDMA), or a Global System for Mobile Communications (GSM) communications function, and the second communications function is one of a Code Division Multiple Access (CDMA), a Wideband Code Division Multiple Access (W-CDMA), or a Global System for Mobile Communications (GSM) communications function.

30. The communication module of claim 25, wherein the first and second number of reconfigurable hardware resources from the plurality of reconfigurable hardware resources depend on availability of the plurality of reconfigurable hardware resources from providing other functions.

31. The communication module of claim 25, wherein the first and second number of reconfigurable hardware resources from the plurality of reconfigurable hardware resources depend on the available clock rate driving the plurality of reconfigurable hardware resources.

32. The communication module of claim 31, wherein the first number of reconfigurable hardware resources selectively configured by the control logic to provide the first communications function at one point in time is capable of being reduced when the available clock rate driving the plurality of reconfigurable hardware resources is increased.

33. The communication module of claim 25, wherein the first and second number of reconfigurable hardware resources from the plurality of reconfigurable hardware resources depend on the incoming signal rate of signals for the first and second communications functions.

34. The communication module of claim 25, wherein the first and second number of reconfigurable hardware resources from the plurality of reconfigurable hardware resources depend on the incoming signal period of signals operated on by the first and second communications functions.

35. The communication module of claim 25, wherein the plurality of reconfigurable hardware resources are further configurable or reconfigurable to provide at least one other function.

36. The communication module of claim 35, wherein the first and second number of reconfigurable hardware resources from the plurality of reconfigurable hardware resources depend on how many of the plurality of reconfigurable hardware resources are needed to provide the at least one other function.

37. The communication module of claim 35, wherein the at least one other function is a non-communications function.

38. The communication module of claim 25, wherein the plurality of reconfigurable hardware resources comprise a plurality of reconfigurable computational units.

39. The communication module of claim 38, wherein the plurality of configurable computational units comprise a plurality of configurable heterogeneous computational elements.

40. The communication module of claim 25, wherein the first communications function comprises at least a portion of a system acquisition function.

41. The communication module of claim 40, further comprising dedicated hardware to provide another portion of the system acquisition function.

42. The communications module of claim 25, further comprising:

a PN sequence generator to provide the PN sequence generator function portion of the system acquisition function; and dedicated hardware to provide the PN sequence generator.

43. The communication module of claim 25, further comprising:

dedicated hardware to provide another portion of the system acquisition function; and wherein the other portion comprises one of the receiver function portion, the PN sequence generator function portion, or the correlator function portion.

44. The communication module of claim 43, wherein the other portion of the system acquisition function is the receiver function portion.

45. The communication module of claim 25, wherein the control logic selectively configures the first number of reconfigurable hardware resources to provide the at least a portion of the system acquisition function; and wherein the at least a portion of the system acquisition function comprises at least one of the receiver function portion, the PN sequence generator function portion, or the correlator function portion.

46. The communication module of claim 25, wherein the at least a portion of the system acquisition function comprises the receiver function portion, the PN sequence generator function portion, and the correlator function portion; and
wherein the control logic selectively configures the first number of reconfigurable hardware resources to provide the receiver function portion, the PN sequence generator function portion, and the correlator function portion.

47. The communication module of claim 46, wherein the control logic selectively configures or reconfigures one or more of the first number of configurable hardware resources to provide at least one other function when not needed to provide the receiver function portion, the PN sequence generator function portion, and the correlator function portion.

48. The communication module of claim 25, further comprising a receiver and a correlator.

49. A method for implementing communications functions in a communications device comprising:
providing a plurality of reconfigurable hardware resources configurable to provide a first communications function, the plurality of reconfigurable hardware resources further configurable or reconfigurable to provide at least a second communications function;
providing an interconnection network having interconnections coupled to each of the plurality of reconfigurable hardware resources;
providing control logic for selectively configuring a first number of reconfigurable hardware resources from the plurality of reconfigurable hardware resources by changing the interconnections of the interconnection network between the first number of reconfigurable hardware resources to provide the first communications function at one point in time, the control logic further for selectively configuring a second number of reconfigurable hardware resources from the plurality of reconfigurable hardware resources to provide at least the second communications function at another point in time by changing the interconnections of the interconnection network between the second number of reconfigurable hardware resources including, the selectively configuring a second number of reconfigurable hardware resources including reconfiguring at least some of the first number of reconfigurable hardware resources by changing the interconnections between the at least some of the first number of reconfigurable hardware resources,
wherein the first communications function comprises at least a portion of a system acquisition function, wherein the system acquisition function includes:
a receiver function portion to receive a plurality of signals;
a PN sequence generator function portion to generate a plurality of PN sequences; and
a correlator function portion to correlate the plurality of signals with the plurality of PN sequences,
wherein at least one of the plurality of hardware resources implements the receiver function, at least one of plurality of hardware resources implements the PN sequence generator function, and wherein at least one of the plurality of hardware resources implements the correlation function, and wherein the at least one of the plurality of hardware resources perform two or more correlations per time period.

50. The method of claim 49, wherein the communications device comprises a mobile phone for use in a Code Division Multiple Access (CDMA) communication system.

51. The method of claim 49, wherein the communications device is a base station.

52. The method of claim 49, wherein at least some of the reconfigurable hardware resources comprise a plurality of configurable and reconfigurable digital signal processing (DSP) computational units, the control logic further for selectively configuring and reconfiguring a third number of digital signal processing computational units depending on for which communications standard the digital signal processing computational units are to be selectively configured or reconfigured.

53. The method of claim 49, wherein the first communications function is one of a Code Division Multiple Access (CDMA), a Wideband Code Division Multiple Access (W-CDMA), or a Global System for Mobile Communications (GSM) communications function, and the second communications function is one of a Code Division Multiple Access (CDMA), a Wideband Code Division Multiple Access (W-CDMA), or a Global System for Mobile Communications (GSM) communications function.

54. The method of claim 49, wherein the first and second number of reconfigurable hardware resources from the plurality of reconfigurable hardware resources depend on availability of the plurality of reconfigurable hardware resources from providing other functions.

55. The method of claim 49, wherein the first and second number of reconfigurable hardware resources from the plurality of reconfigurable hardware resources depend on the available clock rate driving the plurality of reconfigurable hardware resources.

56. The method of claim 55, wherein the first number of reconfigurable hardware resources selectively configured by the control logic to provide the first communications function at one point in time is capable of being reduced when the available clock rate driving the plurality of reconfigurable hardware resources is increased.

57. The method of claim 49, wherein the first and second number of reconfigurable hardware resources from the plurality of reconfigurable hardware resources depend on the incoming signal rate of signals for the first and second communications functions.

58. The method of claim 49, wherein the first and second number of reconfigurable hardware resources from the plurality of reconfigurable hardware resources depend on the incoming signal period of signals operated on by the first and second communications functions.

59. The method of claim 49, wherein the plurality of reconfigurable hardware resources are further configurable or reconfigurable to provide at least one other function, the method further comprising configuring or reconfiguring the plurality of reconfigurable hardware resources to provide the at least one other function.

60. The method of claim 59, wherein the first and second number of reconfigurable hardware resources from the plurality of reconfigurable hardware resources depend on how many of the plurality of reconfigurable hardware resources are needed to provide the at least one other function.

61. The method of claim 59, wherein the at least one other function is a non-communications function.

62. The method of claim 49, wherein the plurality of reconfigurable hardware resources comprise a plurality of reconfigurable computational units.

63. The method of claim 62, wherein the plurality of configurable computational units comprise a plurality of configurable heterogeneous computational elements units.

64. The method of claim 49, wherein the first communications function comprises at least a portion of a system acquisition function.

65. The method of claim 64, further comprising providing dedicated hardware to provide another portion of the system acquisition function.

66. The method of claim 49, further comprising:
providing a PN sequence generator to provide the PN sequence generator function portion of the system acquisition function; and
providing dedicated hardware to provide the PN sequence generator.

67. The method of claim 49, further comprising:
providing dedicated hardware to provide another portion of the system acquisition function; and
wherein the other portion comprises one of the receiver function portion, the PN sequence generator function portion, or the correlator function portion.

68. The method of claim 67, wherein the other portion of the system acquisition function is the receiver function portion.

69. The method of claim 49, wherein the control logic is further for selectively configuring the first number of reconfigurable hardware resources to provide the at least a portion of the system acquisition function; and
wherein the at least a portion of the system acquisition function comprises at least one of the receiver function portion, the PN sequence generator function portion, or the correlator function portion.

70. The method of claim 49, wherein the at least a portion of the system acquisition function comprises the receiver function portion, the PN sequence generator function portion, and the correlator function portion; and
wherein the control logic is further for selectively configuring the first number of reconfigurable hardware resources to provide the receiver function portion, the PN sequence generator function portion, and the correlator function portion.

71. The method of claim 70, wherein the control logic is further for selectively configuring or reconfiguring one or more of the first number of configurable hardware resources to provide at least one other function when not needed to provide the receiver function portion, the PN sequence generator function portion, and the correlator function portion.

72. The method of claim 49, further comprising providing a receiver and a correlator.

* * * * *